United States Patent
Yoshida

(10) Patent No.: US 9,046,862 B2
(45) Date of Patent: Jun. 2, 2015

(54) IMAGE FORMING APPARATUS CONGIGURED TO FORM AN IMAGE BY USING A RECOLORABLE DECOLORABLE COLORANT AND UNDECOLORABLE COLORANT OR A NUNRECOLORABLE DECOLORABLE COLORANT AND FIX BOTH COLORANT AT THE SAME TIME, AND METHOD FOR REUSE OF SHEET

(75) Inventor: Minoru Yoshida, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 554 days.

(21) Appl. No.: 13/307,446

(22) Filed: Nov. 30, 2011

(65) Prior Publication Data
US 2012/0141154 A1    Jun. 7, 2012

Related U.S. Application Data

(60) Provisional application No. 61/419,439, filed on Dec. 3, 2010.

(51) Int. Cl.
G03G 15/20    (2006.01)
G03G 21/00    (2006.01)
G03G 15/00    (2006.01)

(52) U.S. Cl.
CPC ............ G03G 21/00 (2013.01); G03G 15/6585 (2013.01); G03G 15/6591 (2013.01); G03G 15/2039 (2013.01)

(58) Field of Classification Search
CPC ............ G03G 9/0926; G03G 15/6585; G03G 15/2078; G03G 15/2017; H04N 1/32133; H04N 2201/3271; C09D 11/17
USPC .............. 399/69, 341, 390, 223, 54; 358/3.28
See application file for complete search history.

(56) References Cited

U.S. PATENT DOCUMENTS 5,572,291 A * 11/1996 Moriguchi et al. ............ 399/390

FOREIGN PATENT DOCUMENTS

JP    06095494 A  *  4/1994 ............ G03G 15/08
JP    2010-282121       12/2010

* cited by examiner

*Primary Examiner* — Billy Lactaoen
(74) *Attorney, Agent, or Firm* — Amin, Turocy & Watson, LLP

(57) ABSTRACT

According to one embodiment, an image forming apparatus includes an image forming section, a fixing device, and a control section. The image forming section forms images on a sheet with a recolorable decolorable colorant and an undecolorable colorant. The fixing device heats the sheet to fix the recolorable decolorable colorant and the undecolorable colorant on the sheet. The control section performs temperature control for the fixing device and fixes the recolorable decolorable colorant and the undecolorable colorant on the sheet at temperature higher than decoloring start temperature of the recolorable decolorable colorant to thereby fix the recolorable decolorable colorant on the sheet in a decolored state and fix the undecolorable colorant on the sheet in a colored state.

24 Claims, 16 Drawing Sheets

IMAGE FORMING APPARATUS CONGIGURED TO FORM AN IMAGE BY USING A RECOLORABLE DECOLORABLE COLORANT AND UNDECOLORABLE COLORANT OR ANUNRECOLORABLE DECOLORABLE COLORANT AND FIX BOTH COLORANT AT THE SAME TIME, AND METHOD FOR REUSE OF SHEET

CROSS-REFERENCE TO RELATED APPLICATION

This application is based upon and claims the benefit of priority from U.S. provisional application 61/419,439, filed on Dec. 3, 2010; the entire contents of which are incorporated herein by reference.

FIELD

Embodiments described herein relate generally to a technique for forming an image on a sheet to reuse the sheet.

BACKGROUND

In the past, there is known a reusing method for a sheet employing a decolorable colorant that is decolored if heated. In the reusing method, after a sheet on which an image is formed with the decolorable colorant is heated to decolor the image, an image is overwritten with the decolorable colorant again, whereby the sheet is reused.

In this way, in the past, the decolorable colorant is simply used as a colorant for decoloring and overwriting an image. However, it is possible that the decolorable colorant can be put to various uses. There is a demand for development of new uses of the decolorable colorant and development of an image forming apparatus that forms an image using the decolorable colorant to match the uses.

DETAILED DESCRIPTION

Figure 1:
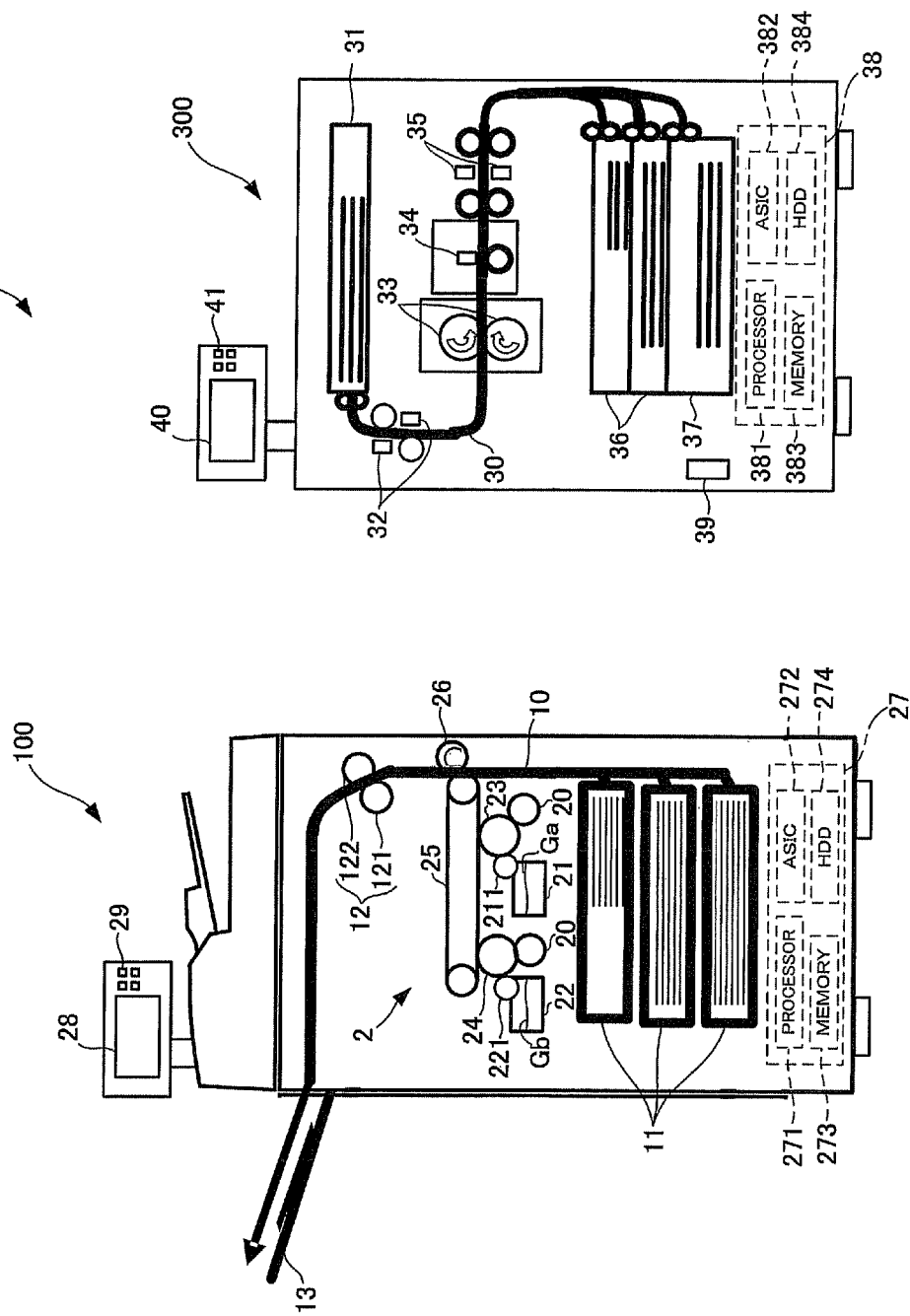
FIG. 1 is a diagram of a sheet reusing system according to a first embodiment.

In general, according to one embodiment, an image forming apparatus includes an image forming section, a fixing device, and a control section. The image forming section forms images on a sheet with a recolorable decolorable colorant and an undecolorable colorant. The fixing device heats the sheet to fix the recolorable decolorable colorant and the undecolorable colorant on the sheet. The control section performs temperature control for the fixing device and fixes the recolorable decolorable colorant and the undecolorable colorant on the sheet at temperature higher than decoloring start temperature of the recolorable decolorable colorant to thereby fix the recolorable decolorable colorant on the sheet in a decolored state and fix the undecolorable colorant on the sheet in a colored state.

In general, according to another embodiment, an image forming apparatus includes an image forming section, a fixing device, and a control section. The image forming section forms images on a sheet with a recolorable decolorable colorant and an unrecolorable decolorable colorant, decoloring start temperature of which is higher than decoloring start temperature of the recolorable decolorable colorant. The fixing device heats the sheet to fix the recolorable decolorable colorant and the unrecolorable decolorable colorant on the sheet. The control section performs temperature control for the fixing device and fixes the recolorable decolorable colorant and the unrecolorable decolorable colorant on the sheet at temperature higher than the decoloring start temperature of the recolorable decolorable colorant and lower than the decoloring start temperature of the unrecolorable decolorable colorant to thereby fix the recolorable decolorable colorant on the sheet in a decolored state and fix the unrecolorable decolorable colorant on the sheet in a colored state.

In general, according to still another embodiment, an image forming apparatus includes an image forming section, a fixing device, and a control section. The image forming section forms images on a sheet with a recolorable decolorable colorant and an unrecolorable decolorable colorant, decoloring start temperature of which is higher than decoloring start temperature of the recolorable decolorable colorant. The fixing device heats the sheet to fix the recolorable decolorable colorant and the unrecolorable decolorable colorant on the sheet. The control section performs temperature control for the fixing device and fixes the recolorable decolorable colorant and the unrecolorable decolorable colorant on the sheet at temperature lower than decoloring completion temperature of the recolorable decolorable colorant to thereby fix both the recolorable decolorable colorant and the unrecolorable decolorable colorant on the sheet in a colored state.

In general, according to still another embodiment, an image forming apparatus includes an image forming section, a fixing device, and a control section. The image forming section forms images on a sheet with a recolorable decolorable colorant and an unrecolorable decolorable colorant, decoloring start temperature of which is higher than decoloring start temperature of the recolorable decolorable colorant. The fixing device heats the sheet to fix the recolorable decolorable colorant and the unrecolorable decolorable colorant on the sheet. The control section performs temperature control for the fixing device and fixes the recolorable decolorable colorant and the unrecolorable decolorable colorant on the sheet at temperature lower than decoloring start temperature of the unrecolorable decolorable colorant to thereby fix the recolorable decolorable colorant on the sheet in a decolored state and fix the unrecolorable decolorable colorant on the sheet in a colored state or fix both the recolorable decolorable colorant and the unrecolorable decolorable colorant on the sheet in the colored state.

Embodiments are explained below with reference to the drawings.

First Embodiment

FIG. 1 is a diagram of a sheet reusing system 1.

The sheet reusing system 1 includes an image forming apparatus 100 and a sheet reusing apparatus 300.

An image forming apparatus 100 is an MFP (Multi Function Peripheral). The image forming apparatus 100 includes a sheet conveying path 10, cassettes 11, an image forming section 2, a fixing device 12, and a paper discharge tray 13. The sheet conveying path 10 includes conveying rollers. After causing a sheet extracted from the cassettes 11 to pass through the sections 2 and 12, the sheet conveying path 10 discharges the sheet onto the paper discharge tray 13. The image forming section 2 includes an electrifying roller 20, developing devices 21 and 22, photoconductive members 23 and 24, an intermediate transfer belt 25, a transfer roller 26, a control section 27, a display section 28, and an operation input section 29.

The electrifying roller 20 charges the photoconductive members 23 and 24.

Electrostatic latent images are formed on the photoconductive members 23 and 24 by a laser optical system.

The developing devices 21 and 22 supply toners Ga and Gb, which are stored therein, to the photoconductive members 23 and 24 with developing rollers 211 and 221 and develop the electrostatic latent images on the photoconductive members 23 and 24.

The developing device 21 develops the electrostatic latent image on the photoconductive member 23 using the recolorable decolorable toner Ga (a decolorable colorant). The decolorable toner Ga starts to be decolored at decoloring start temperature slightly lower than decoloring completion temperature 90° C. and is completely decolored at the decoloring completion temperature 90° C. The decolorable toner Ga starts to be recolored at recoloring start temperature slightly higher than recoloring completion temperature −5° C. and is completely recolored at the recoloring completion temperature −5° C.

The developing device 22 develops the electrostatic latent image on the photoconductive member 24 using the undecolorable toner Gb (colorant).

Both or one of the developing devices 21 and 22 may include a single developing device that stores toners GaK and GbK of K (black). Both or one of the developing devices 21 and 22 may include a developing device that stores toners GaY and GbY of Y (yellow), a developing device that stores toners GaM and GbM of M (magenta), a developing device that stores toners GaC and GbC of C (Cyan), and a developing device that stores toners GaK and GbK of K.

The photoconductive members 23 and 24 transfer an image formed with the decolorable toner Ga and an image formed with the undecolorable toner Gb onto the intermediate transfer belt 25.

The transfer roller 26 is applied with a voltage having polarity opposite to the polarity of the toner images on the intermediate transfer belt 25 (in the case of a negatively charged toner, a positive voltage) to thereby transfer the images on the intermediate transfer belt 25 onto a sheet.

The fixing device 12 includes a fixing roller 121 and a pressing roller 122 that nips and conveys the sheet in cooperation with the fixing roller 121. The fixing roller 121 includes a heater on the inside thereof and is heated by the heater. The fixing roller 121 may be a roller, the outer circumferential surface of which is heated by an IH (Induction Heating) coil opposed to the outer circumferential surface.

Figure 2:
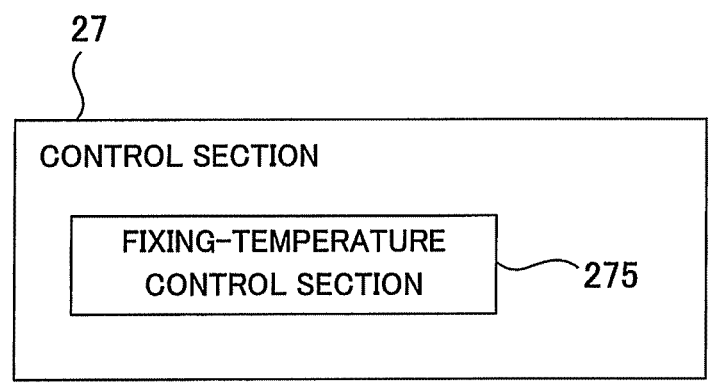
FIG. 2 is a functional block diagram of functional sections included in a control section of an image forming apparatus.

The control section 27 includes a processor 271, an ASIC (Application Specific Integrated Circuit) 272, a memory 273, and an HDD (Hard Disk Drive) 274 and controls the entire image forming apparatus 100 including the image forming section 2 and the fixing device 12. The control section 27 includes a fixing-temperature control section 275 as a functional section realized by the processor 271 reading a computer program stored by the memory 273 and the HDD 274 or a functional section realized by the ASIC 272 (FIG. 2).

The display section 28 is a touch panel. The operation input section 29 is buttons. The image forming apparatus 100 receives an operation input of a user through the display section 28 and the operation input section 29.

Figure 3:
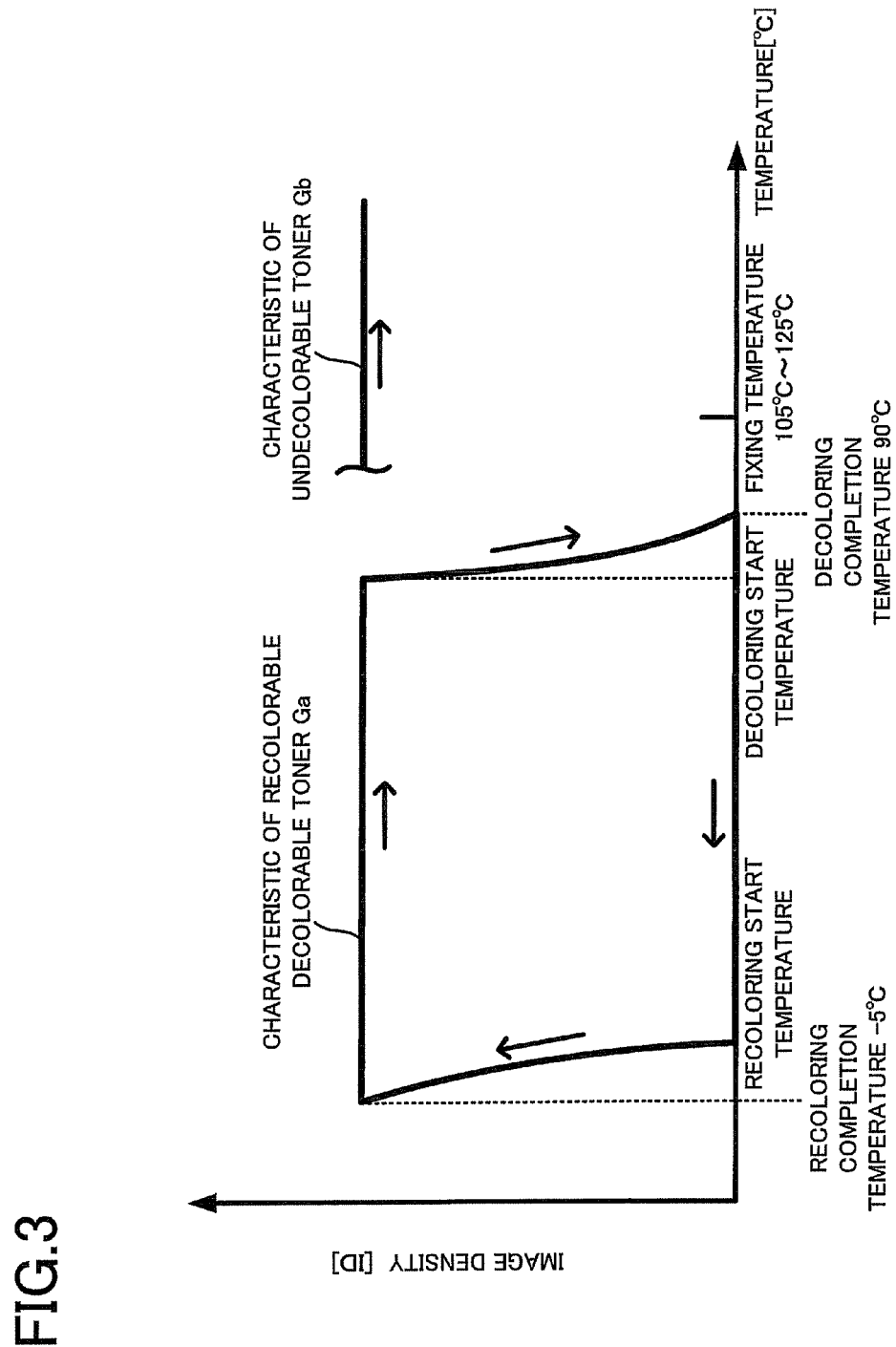
FIG. 3 is a conceptual diagram for explaining characteristics of toners and fixing control for the toners.

FIG. 3 is a conceptual diagram for explaining characteristics of the toners Ga and Gb and fixing control for the toners Ga and Gb.

Even if the decolorable toner Ga is colored on a sheet, the decolorable toner Ga starts to be decolored if heated to the decoloring start temperature (e.g., 85° C.) slightly lower than the decoloring completion temperature 90° C. and is completely decolored at the decoloring completion temperature 90° C. The decoloring start temperature indicates temperature at which image density (ID) by the decolorable toner Ga in a colored state is equal to or lower than 75 percent. The decoloring completion temperature indicates temperature at which image density by the decolorable toner Ga in the colored state is equal to or lower than 25 percent.

Once decolored, the decolorable toner Ga is not colored even at temperature equal to or lower than the decoloring completion temperature 90° C. However, even if the decolorable toner Ga is decolored on a sheet, the decolorable toner Ga starts to be recolored if cooled to recoloring start temperature (e.g., 0° C.) slightly higher than the recoloring completion temperature −5° C. and is completely recolored at the recoloring completion temperature −5° C. The recoloring start temperature indicates temperature at which image density by the decolorable toner Ga in a decolored state is equal to or higher than 25 percent. The recoloring completion temperature indicates temperature at which image density by the decoloring toner Ga in the decolored state is equal to or higher than 75 percent.

Once recolored, the decolorable toner Ga is colored even at temperature equal to or higher than the recoloring completion temperature −5° C. However, the decolorable toner Ga is decolored again if heated to the decoloring completion temperature 90° C.

In a state in which the undecolorable toner Gb is colored on the sheet, the undecolorable toner Gb is not decolored even if heated to high temperature or cooled to low temperature and maintains the colored state.

The fixing device 12 fixes, under the control by the control section 27, the decolorable toner Ga and the undecolorable toner Gb on the sheet at temperature 105° C. to 125° C. higher than the decoloring completion temperature 90° C. of the decolorable toner Ga. Consequently, the fixing device 12 fixes the decolorable toner Ga on the sheet in the decolored state and fixes the undecolorable toner Gb on the sheet in the colored state.

In other words, in this embodiment, on the sheet on which the images are formed by the image forming apparatus 100, at the room temperature (e.g., 20° C.), the image formed with the decolorable toner Ga is decolored and in an invisible state and only the image formed with the undecolorable toner Gb is colored and is in a visible state.

By cooling the sheet to temperature equal to or lower than the recoloring completion temperature −5° C., it is possible to recolor the image formed with the decolorable toner Ga and both the image formed with the decolorable toner Ga and the image formed with the undecolorable toner Gb are in the visible state. By heating the sheet to temperature equal to or higher than the decoloring completion temperature 90° C., the image formed with the decolorable toner Ga is decolored and only the image formed with the undecolorable toner Gb returns to the visible initial state. This state is maintained even at the room temperature (e.g., 20° C.).

If the temperature of the fixing device 12 exceeds 125° C. during the fixing of the toners Ga and Gb on the sheet, the viscosity of the toners Ga and Gb falls and high-temperature offset occurs in which the toners Ga and Gb adhere to the fixing roller 121 side. Therefore, in this embodiment, in order to prevent occurrence of the high-temperature offset, the temperature of the fixing device 12 is controlled to 115° C.±10° C.

Referring back to FIG. 1, the sheet reusing apparatus 300 includes a sheet conveying path 30, a cassette 31, first reading sections 32, heating sections 33, cooling sections 34, second reading sections 35, a control section 38, reusable sheet cassettes 36, an unreusable sheet cassette 37, a communication section 39, a display section 40, and an operation input section 41.

After causing a sheet in the cassette 31 to pass through the sections 32 to 35, the sheet conveying section 30 discharges the sheet to the cassettes 36 and 37.

The cassette 31 stores sheets on which images are formed by the image forming apparatus 100.

Two first reading sections 32 for front side reading and rear side reading for a sheet are provided and read images on the front and rear sides of the sheet almost at the same time. As the first reading sections 32, for example, CCD (Charge Coupled Device) image sensors can be adopted. The first reading sections 32 read images of the sheet before decoloring or images of the sheet before recoloring. Image data read by the first reading sections 32 is stored in a memory 383 of the control section 38.

Two cooling sections 34 for front side cooling and rear side cooling for a sheet are provided. The cooling sections 34 are Peltier elements. The cooling sections 34 cool, under the control by the control section 38, the decolorable toner Ga in the decolored state on the sheet at temperature −5° C. to −10° C. equal to or lower than the recoloring completion temperature −5° C. to thereby recolor the decolorable toner Ga and set the image formed with the decolorable toner Ga in the visible state. The cooling sections 34 may have structure for cooling the sheet using vaporization heat of liquid or may have structure for cooling the sheet using, liquid nitrogen, dry ice, ice or the like.

Two heating sections 33 for front side heating and rear side heating for a sheet are provided. The heating sections 33 are heat rollers incorporating lamps. The heating sections 33 heat, under the control by the control section 38, the decolorable toner Ga on the recolored sheet at temperature 90° C. to 125° C. higher than the decoloring completion temperature 90° C. of the decolorable toner Ga to thereby decolor the decolorable toner Ga again and set the image formed with the decolorable toner Ga in the invisible state. Like the fixing device 12 of the image forming apparatus 100, in order to prevent occurrence of the high-temperature offset of the toners Ga and Gb, the heating sections 33 heat the sheet at 90° C. to 125° C. The heating sections 33 may be thermal bars, roller including IH heaters, belt heating devices, and the like.

Like the first reading sections 32, the second reading sections 35 are CCDs or the like and read images on the front and rear sides of the sheet almost at the same time. The second reading sections 35 read images of the sheet after decoloring or images of the sheet after recoloring. Image data read by the second reading sections 35 is stored in the memory 383.

Figure 4:
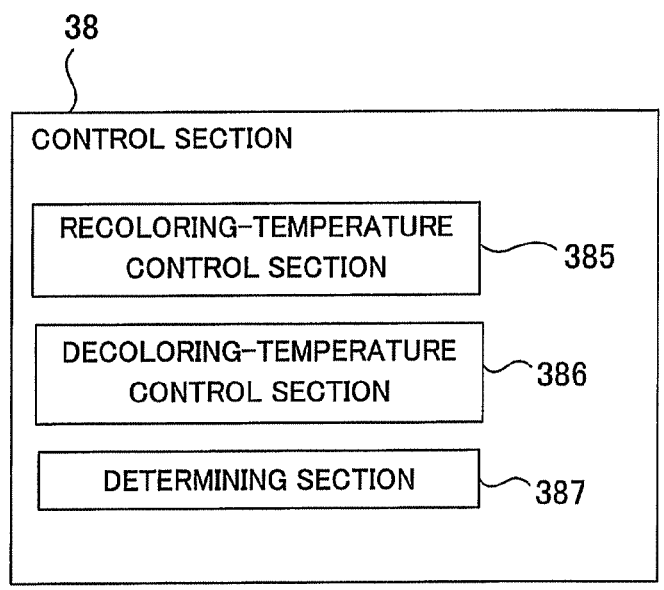
FIG. 4 is a functional block diagram of functional sections included in a control section of a sheet reusing apparatus.

The control section 38 includes a processor 381, an ASIC 382, a memory 383, and an HDD 384 and controls the entire sheet reusing apparatus 300. The control section 38 includes a recoloring-temperature control section 385, a decoloring-temperature control section 386, and a determining section 387 as functional sections realized by the processor 381 reading a computer program stored in the memory 383 and the HDD 384 or functional sections realized by the ASIC 382 (FIG. 4).

Among the functional sections 385 to 387, the determining section 387 determines, from the image data read by the second reading sections 35, on the basis of the surface reflectance or the like of the sheet subjected to the decoloring processing and the recoloring processing, whether the sheet is reusable (whether the decoloring and the recoloring are sufficient). If the sheet is subjected to the decoloring processing, the determining section 387 determines that the sheet is reusable if the surface reflectance of the sheet is equal to or higher than a threshold and determines that the sheet is unreusable if the surface reflectance of the sheet is lower than the threshold. If the sheet is subjected to the recoloring processing, the determining section 387 determines that the sheet is reusable if the surface reflectance of the sheet is lower than the threshold and determines that the sheet is unreusable if the surface reflectance of the sheet is equal to or higher than the threshold.

The control section 38 discharges the sheet determined as reusable to the reusable sheet cassettes 36 and discharges the sheet determined as unreusable to the unreusable sheet cassette 37.

The communication section 39 performs, under the control by the control section 38, transmission and reception of data to and from an external apparatus connected to the sheet reusing apparatus 300 to be capable of communicating with each other. The communication section 39 transmits the image of the sheet before the decoloring and the image of the sheet before the recoloring read by the first reading sections 32 to a database and transmits the images to an address of a user to enable the user to receive the images with a PC (Personal Computer) in the user's home.

The display section 40 is a touch panel. The operation input section 41 is buttons. The sheet reusing apparatus 300 receives an operation input of the user through the display section 40 and the operation input section 41.

Figure 5:
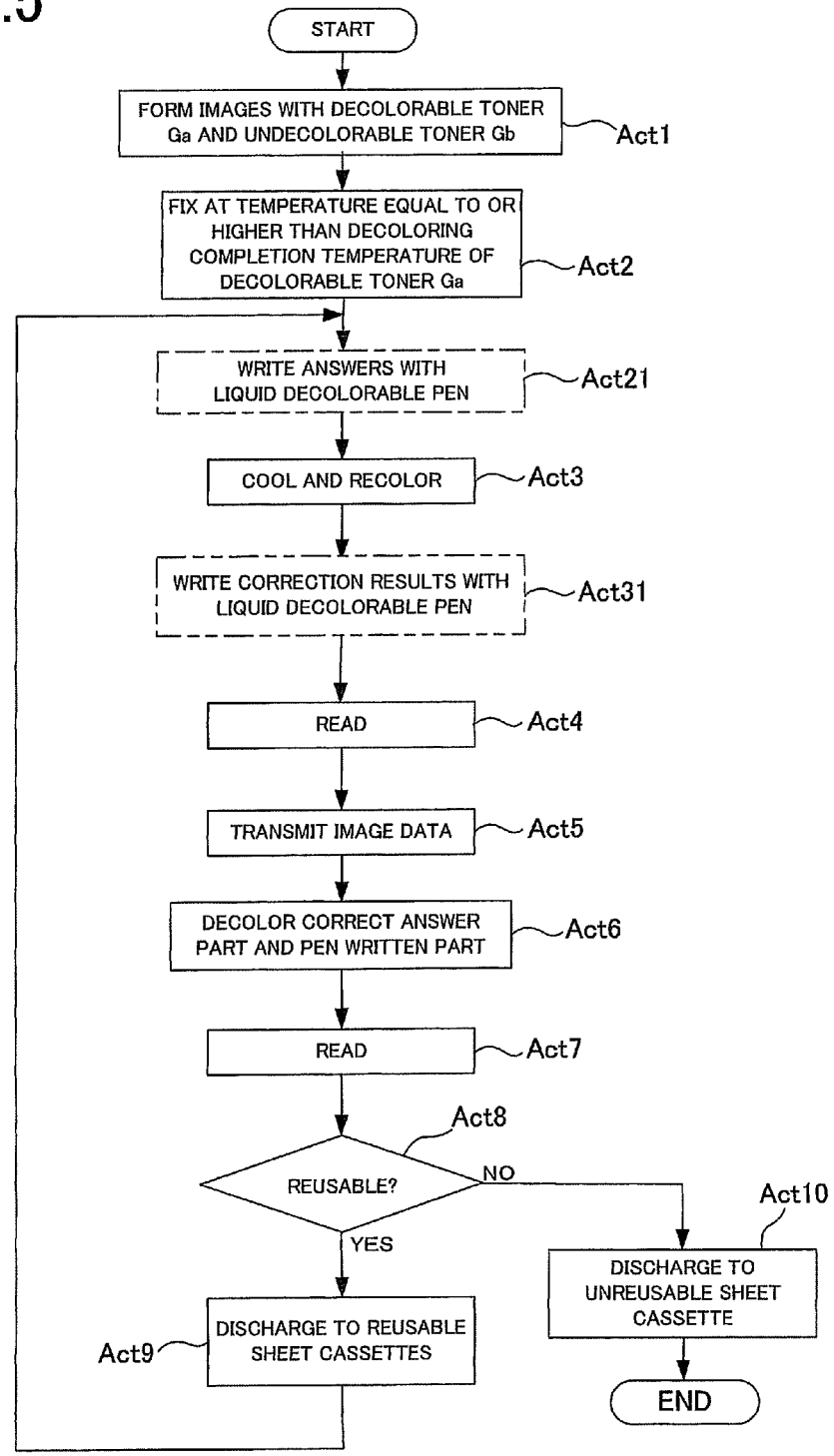
FIG. 5 is a flowchart for explaining reuse processing for a sheet by the sheet reusing system.

An example of reuse processing for a sheet by the sheet reusing system 1 is explained below with reference to a flowchart of FIG. 5. The processors 271 and 381 read computer programs non-temporarily stored by the memories 273 and 383, whereby the apparatuses 100 and 300 perform the reuse processing for a sheet.

Figure 6:
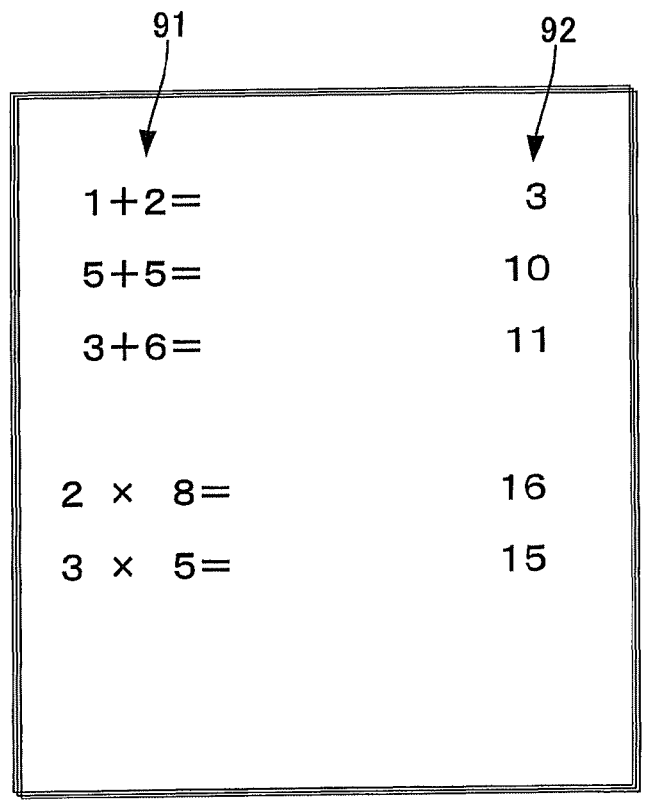
FIG. 6 is a diagram of images before fixing formed on a sheet.

FIG. 6 is a diagram of images 91 and 92 before fixing formed on a sheet.

The image forming apparatus 100 forms, with the image forming section 2, images on a sheet using the recolorable decolorable toner Ga and the undecolorable toner Gb (Act 1). In this embodiment, the image forming apparatus 100 forms a question part 91 using the undecolorable toner Gb and forms a correct answer part 92 using the recolorable decolorable toner Ga.

Figure 7:
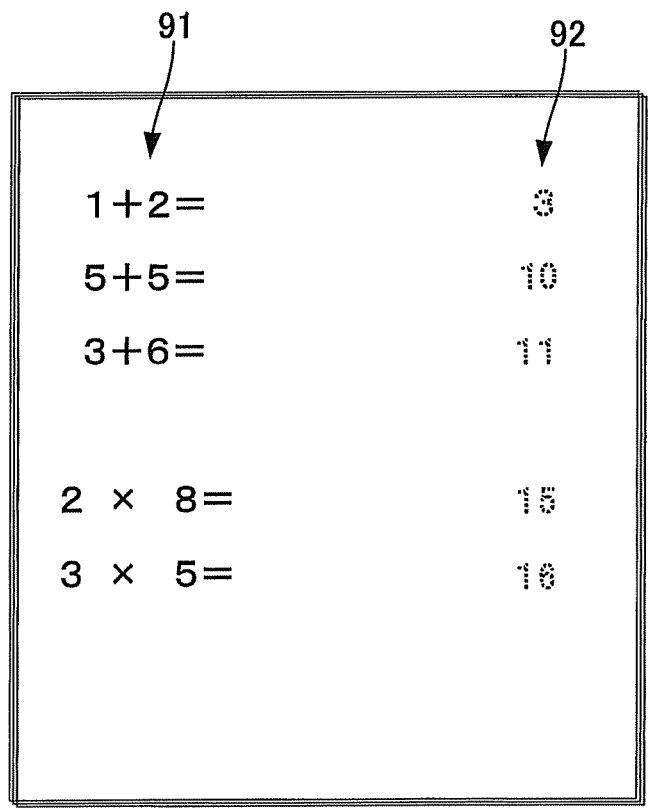
FIG. 7 is a diagram of the images fixed on the sheet.

FIG. 7 is a diagram of the images 91 and 92 fixed on the sheet.

The image forming apparatus 100 (the fixing-temperature control section 275) heats and presses, with the fixing device 12, at temperature 105° C. to 125° C. higher than the decoloring completion temperature 90° C. of the decolorable toner Ga, the sheet on which the images including the question part 91 and the correct answer part 92 are formed (Act 2). Consequently, the image forming apparatus 100 fixes, in the colored state, on the sheet, the question part 91 formed with the undecolorable toner Gb and fixes, in the decolored state, on the sheet, the correct answer part 92 formed with the decolorable toner Ga.

Figure 8:
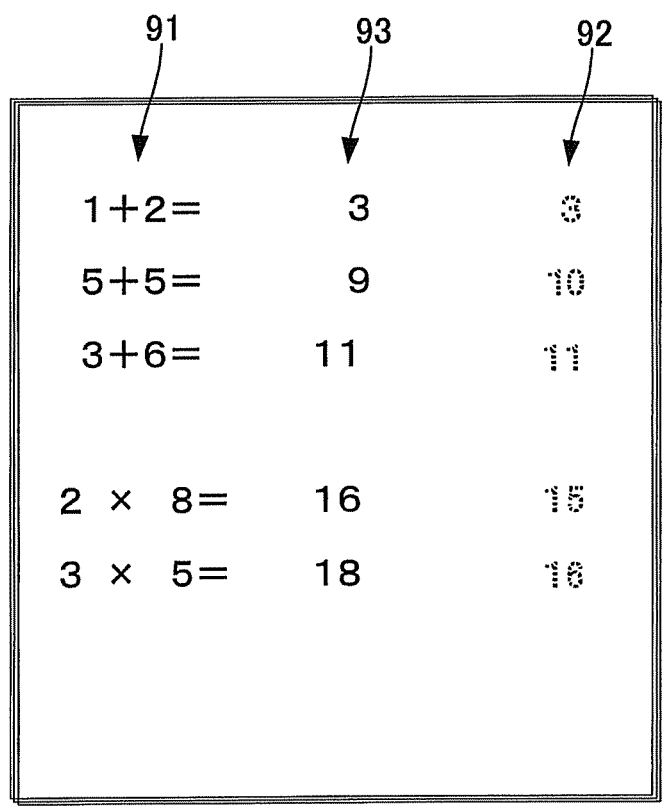
FIG. 8 is a diagram of a state in which answers are written by a liquid decolorable pen.

FIG. 8 is a diagram of a state in which answers are written by a liquid decolorable pen.

After Act 2, a user A such as a student writes answers on the sheet with a liquid decolorable pen (Act 21). The liquid decolorable pen means a pen containing decolorable ink that is decolored if heated. The liquid decolorable pen is publicly known. For example, the decolorable ink of the liquid decolorable pen has decoloring completion temperature of 75° C. In the following explanation, an image written on the sheet by the user and formed by the liquid decolorable pen is referred to as pen written part 93.

A user B such as a teacher different from the user A sets the sheet on which the user A writes the answers in the sheet reusing apparatus 300 and instructs the sheet reusing apparatus 300 to recolor the image (the correct answer part 92) (a recoloring mode). The sheet reusing apparatus 300 (the recoloring-temperature control section 385) cools the sheet with the cooling section 34 at temperature −5° C. to −10° C. equal to or lower than the recoloring completion temperature −5° C. of the recolorable decolorable toner Ga and recolors the correct answer part 92 in the decolored state (Act 3).

Figure 9:
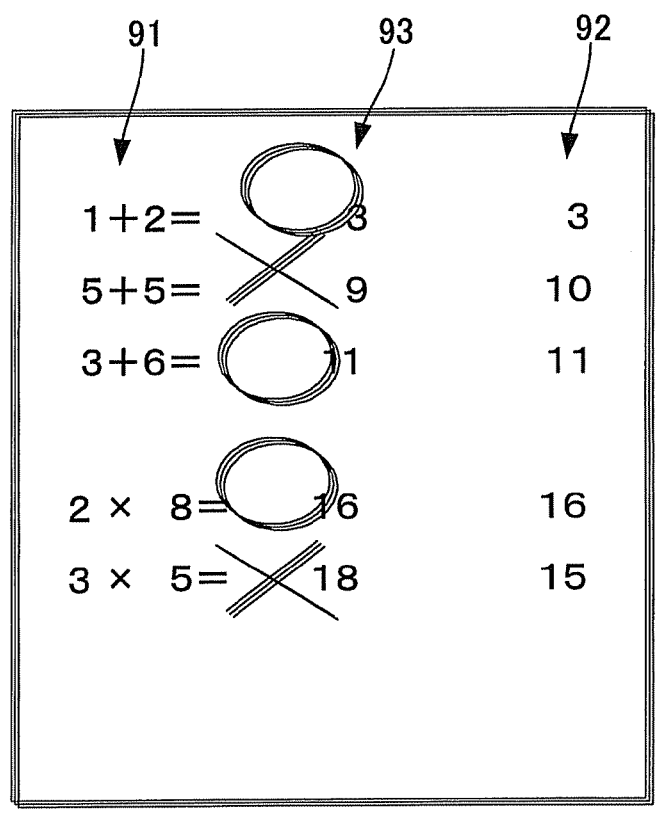
FIG. 9 is a diagram of a state in which correction results are written by the liquid decolorable pen.

FIG. 9 is a diagram of a state in which correction results are written by the liquid decolorable pen.

After recoloring the correct answer part 92 in the sheet reusing apparatus 300, the user B writes correction results on the sheet (the pen written part 93) with the liquid decolorable pen referring to the correct answer part 92 (Act 31).

After writing the correction results, the user B sets the sheet in the sheet reusing apparatus 300 again and instructs the sheet reusing apparatus 300 to decolor the images (the correct answer part 92 and the pen written part 93) (a decoloring mode).

Then, first, the sheet reusing apparatus 300 reads, with the first reading sections 32, the images on the sheet for which answer checking is performed and stores image data in the memory 383 (Act 4). The sheet reusing apparatus 300 transmits the image data of the sheet for which the answer checking is performed to the database and transmits the image data to an address of the user A such as a student to enable the user A to receive the image data in a PC in the user's home (Act 5).

At the same time, the sheet reusing apparatus 300 (the decoloring-temperature control section 386) heats, with the heating sections 33, the sheet at temperature 105° C. to 125° C. higher than the decoloring completion temperature 90° C. of the decolorable toner Ga and decoloring completion temperature 75° C. of the decolorable ink of the liquid decolorable pen (Act 6). Consequently, both the correct answer part 92 formed with the decolorable toner Ga and the pen written part 93 formed by the liquid decolorable pen are decolored and set in the invisible state (the state shown in FIG. 7).

Thereafter, the sheet reusing apparatus 300 reads, with the second reading sections 35, the image on the sheet on which the correct answer part 92 and the pen written part 93 are decolored (Act 7).

Subsequently, the sheet reusing apparatus 300 (the determining section 387) determines, on the basis of the image data read by the second reading sections 35, from the surface reflectance or the like of the sheet subjected to the decoloring processing, whether the sheet is reusable (Act 8).

If the sheet reusing apparatus 300 determines that the sheet is reusable because the surface reflectance of the sheet is equal to or higher than the threshold (YES in Act 8), the sheet reusing apparatus 300 discharges the sheet to the reusable sheet cassettes 36 (Act 9). Consequently, the users can perform the answering, the recoloring, and the answer checking again using the sheet in the reusable sheet cassettes 36 and can reuse the sheet as a question sheet.

On the other hand, if the sheet reusing apparatus 300 determines that the sheet is unreusable because the surface reflectance of the sheet is lower than the threshold (NO in Act 8), the sheet reusing apparatus 300 discharges the sheet to the unreusable sheet cassette 37 (Act 10).

In the past, a decolorable toner is fixed on a sheet in a state in which the decolorable toner is colored and a sheet is heated to decolor an image formed with the decolorable toner. In the past, the sheet is reused by overwriting a decolored portion with the decolorable toner anew.

In this embodiment, unlike the past, the decolorable toner Ga and the undecolorable toner Gb are fixed on the sheet in a state in which the decolorable toner Ga is decolored and the undecolorable toner Gb is colored.

Consequently, in this embodiment, first, the image formed with the decolorable toner Ga can be set in the invisible state. Therefore, the sheet can be put to various uses. For example, as explained in this embodiment, after writing an image on the sheet with the liquid decolorable pen, it is possible to recolor the image formed with the decolorable toner Ga by cooling the sheet and additionally write a new image on the basis of the recolored image.

In this embodiment, after writing an image on the sheet with the liquid decolorable pen, it is possible to combine the image formed with the undecolorable toner Gb, which is visible from the beginning, the image written by the liquid decolorable pen, and the image recolored with the decolorable toner Ga by cooling the sheet and complete one picture or figure or a sentence. It goes without saying that the sheet can be put to a useful use without writing by the liquid decolorable pen. For example, it is possible to combine the image formed with the undecolorable toner Gb, which is visible from the beginning, and the image recolored with the decolorable toner Ga by cooling the sheet. Consequently, it is possible complete one picture or figure or a sentence having new meaning and effect.

In this way, this embodiment can provide unprecedented uses of the sheet (the decolorable toner Ga).

Second Embodiment

Figure 10:
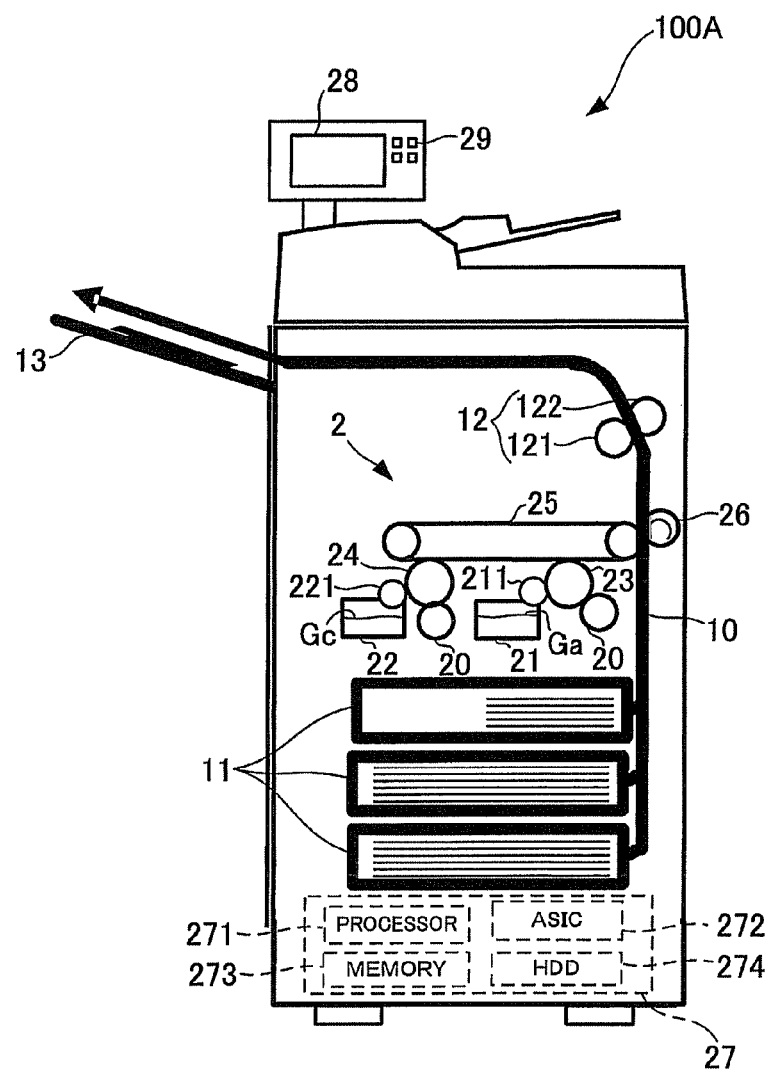
FIG. 10 is a diagram of an image forming apparatus according to a second embodiment.
Figure 11:
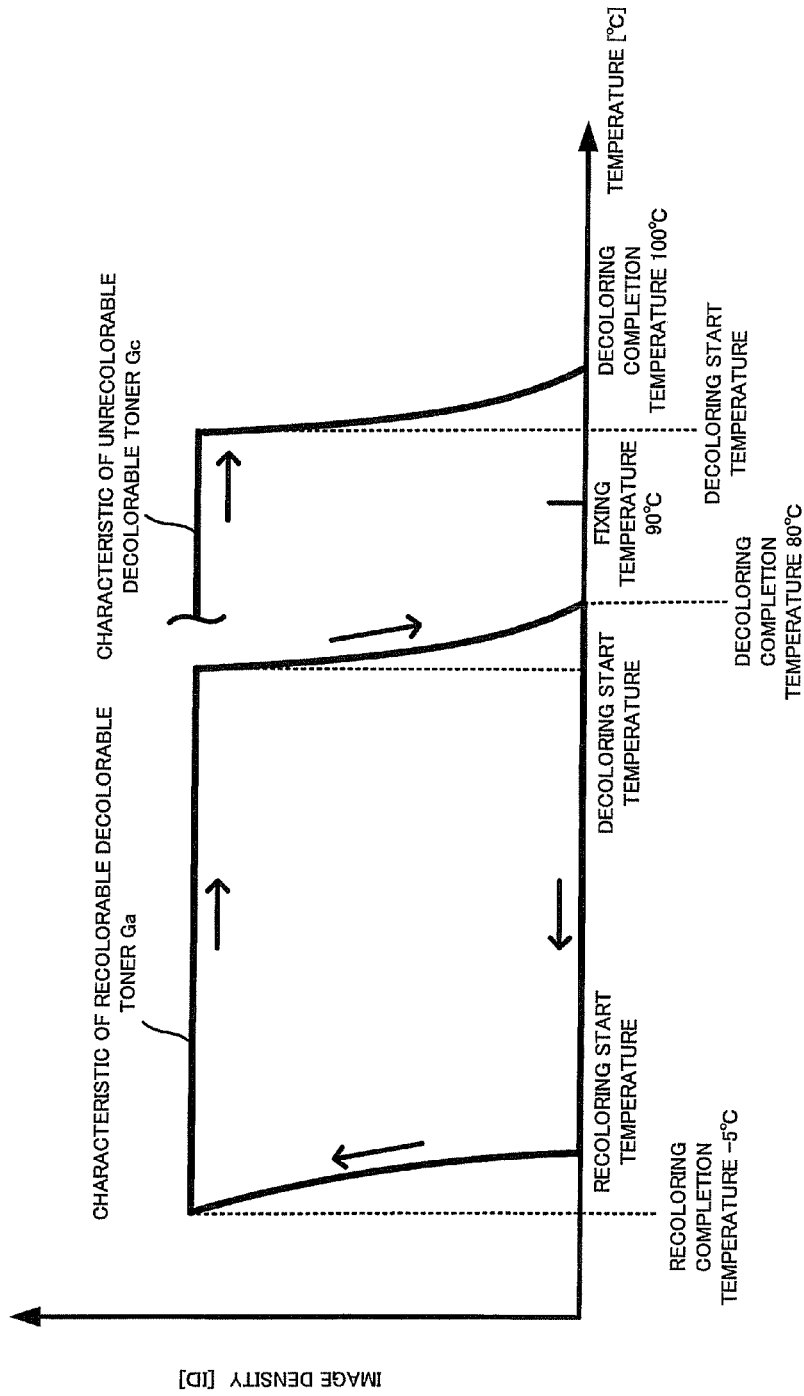
FIG. 11 is a conceptual diagram for explaining characteristics of toners and fixing control for the toners.

FIG. 10 is a diagram of an image forming apparatus 100A. FIG. 11 is a conceptual diagram for explaining characteristics of toners Ga and Gc and fixing control for the toners Ga and Gc.

In this embodiment, in the image forming apparatus 100A, as in the first embodiment, the developing device 21 forms an image as the correct answer part 92 on the photoconductive member 23 using the recolorable decolorable toner Ga. In this embodiment, the decolorable toner Ga is completely decolored at decoloring completion temperature 80° C. and is completely recolored at recoloring completion temperature −5° C.

On the other hand, unlike the first embodiment, the developing device 22 forms an image as the question part 91 on the photoconductive member 24 using the unrecolorable decolorable toner Gc (a decolorable colorant), decoloring start temperature of which is temperature higher than the decoloring completion temperature 80° C. of the decolorable toner Ga (temperature slightly lower than 100° C.)

The sheet reusing system 1 according to this embodiment includes the image forming apparatus 100A and the sheet reusing apparatus 300 same as the sheet reusing apparatus 300 according to the first embodiment.

Figure 12:
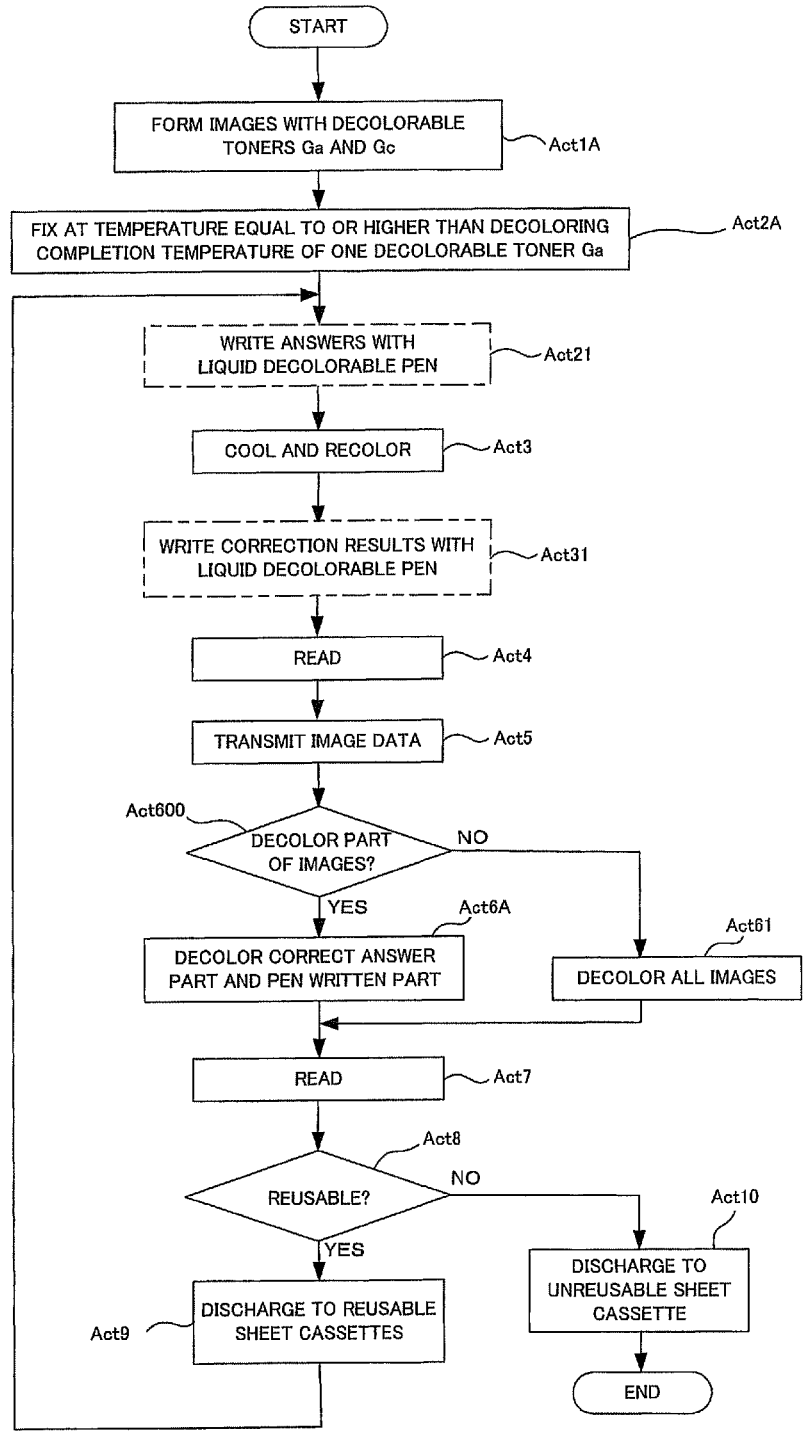
FIG. 12 is a flowchart for explaining reuse processing for a sheet by a sheet reusing system.

Reuse processing for a sheet by the sheet reusing system 1 is explained with reference to a flowchart of FIG. 12.

The image forming apparatus 100A forms the correct answer part 92 with the recolorable decolorable toner Ga and forms the question part 91 with the unrecolorable decolorable toner Gc, decoloring start temperature of which is higher than the decoloring completion temperature 80° C. of the decolorable toner Ga (Act 1A).

The image forming apparatus 100A (the fixing-temperature control section 275) heats and presses, with the fixing device 12, at temperature 90° C. higher than the decoloring completion temperature 80° C. of the recolorable decolorable toner Ga and lower than decoloring start temperature of the unrecolorable decolorable toner Gc, the sheet on which the question part 91 and the correct answer part 92 are formed (Act 2A).

Consequently, the image forming apparatus 100A fixes, in the decolored state, on the sheet, the correct answer part 92 formed with the recolorable decolorable toner Ga and fixes, in the colored state, on the sheet, the question part 91 formed with the unrecolorable decolorable toner Gc.

Subsequently, the user A such as a student writes answers on the sheet with the liquid decolorable pen and forms the pen written part 93 (Act 21).

The user B such as a teacher sets the sheet in the sheet reusing apparatus 300 and recolors the correct answer part 92 (Act 3). The user B writes correction results on the sheet (the pen written part 93) with the liquid decolorable pen referring to the correct answer part 92 (Act 31).

The user B sets the sheet in the sheet reusing apparatus 300. If the user B decolors only the correct answer part 92 and the pen written part 93 and reuses the sheet as a question sheet again, the user B operates the display section 40 and the operation input section 41 and instructs the sheet reusing apparatus 300 to that effect. If the user B decolors all the question part 91, the correct answer part 92, and the pen written part 93 and reuses the sheet as white paper, the user B instructs the sheet reusing apparatus 300 to that effect.

The sheet reusing apparatus 300 reads the images on the sheet (Act 4) and transmits image data to the database and an address of the user A such as a student (Act 5).

If the sheet reusing apparatus 300 (the decoloring-temperature control section 386) receives the instruction to reuse the sheet as a question sheet (YES in Act 600), the sheet reusing apparatus 300 heats the sheet at temperature 90° C. higher than the decoloring completion temperature 80° C. of the recolorable decolorable toner Ga and lower than the decoloring start temperature of the unrecolorable decolorable toner Gc (Act 6A). Consequently, only the correct answer part 92 and the pen written part 93 are decolored and only the question part 91 is colored.

On the other hand, if the sheet reusing apparatus 300 (the decoloring-temperature control section 386) receives the instruction to reuse the sheet as white paper (NO in Act 600), the sheet reusing apparatus 300 heats the sheet at temperature 110° C. higher than decoloring completion temperature 100° C. of the unrecolorable decolorable toner Gc (Act 61). Consequently, all the question part 91, the correct answer part 92, and the pen written part 93 are decolored and the sheet changes to white paper.

Thereafter, the sheet reusing apparatus 300 reads the images on the sheet (Act 7). If the decoloring is sufficient and the sheet is reusable (YES in Act 8), the sheet reusing apparatus 300 discharges the sheet to the reusable sheet cassettes 36 (Act 9). If the decoloring is insufficient and the sheet is unreusable (NO in Act 8), the sheet reusing apparatus 300 discharges the sheet to the unreusable sheet cassette 37 (Act 10).

In this embodiment, the decolorable toner Gc, the decoloring start temperature of which is higher than the decoloring start temperature of the decolorable toner Ga, is used instead of the undecolorable toner Gb. Therefore, it is possible to change the sheet to white paper by heating the sheet at temperature 110° C. equal to or higher than the decoloring completion temperature 100° C. of the decolorable toner Gc. It is possible to further increase uses of the reuse of the sheet.

Third Embodiment

Figure 13:
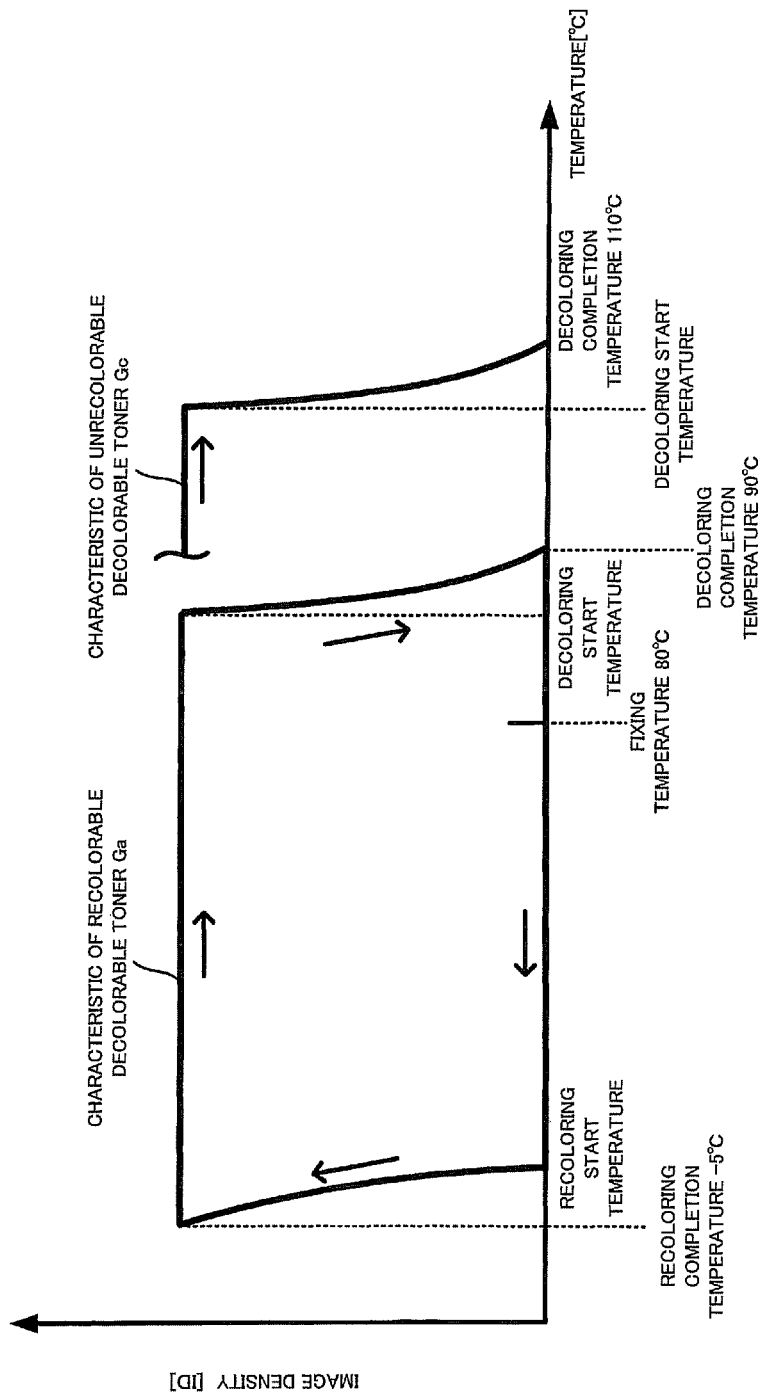
FIG. 13 is a conceptual diagram for explaining characteristics of toners and fixing control for the toners in a third embodiment.

The image forming apparatus 100A according to a third embodiment is the same as the image forming apparatus 100A according to the second embodiment. The image forming apparatus 100A forms images on a sheet with the recolorable decolorable toner Ga and the unrecolorable decolorable toner Gc, the decoloring start temperature of which is higher than the decoloring completion temperature of the decolorable toner Ga. The sheet reusing apparatus 300 according to this embodiment is the same as the sheet reusing apparatus 300 according to the second embodiment. This embodiment is different from the second embodiment in a method of controlling the image forming apparatus 100A. In this embodiment, the image forming apparatus 100A prints a sentence for memorization on a sheet. In this embodiment, as shown in FIG. 13, the decoloring completion temperature of the recolorable decolorable toner Ga is set to 90° C. and the decoloring completion temperature of the unrecolorable decolorable toner Gc is set to 110° C.

Figure 14:
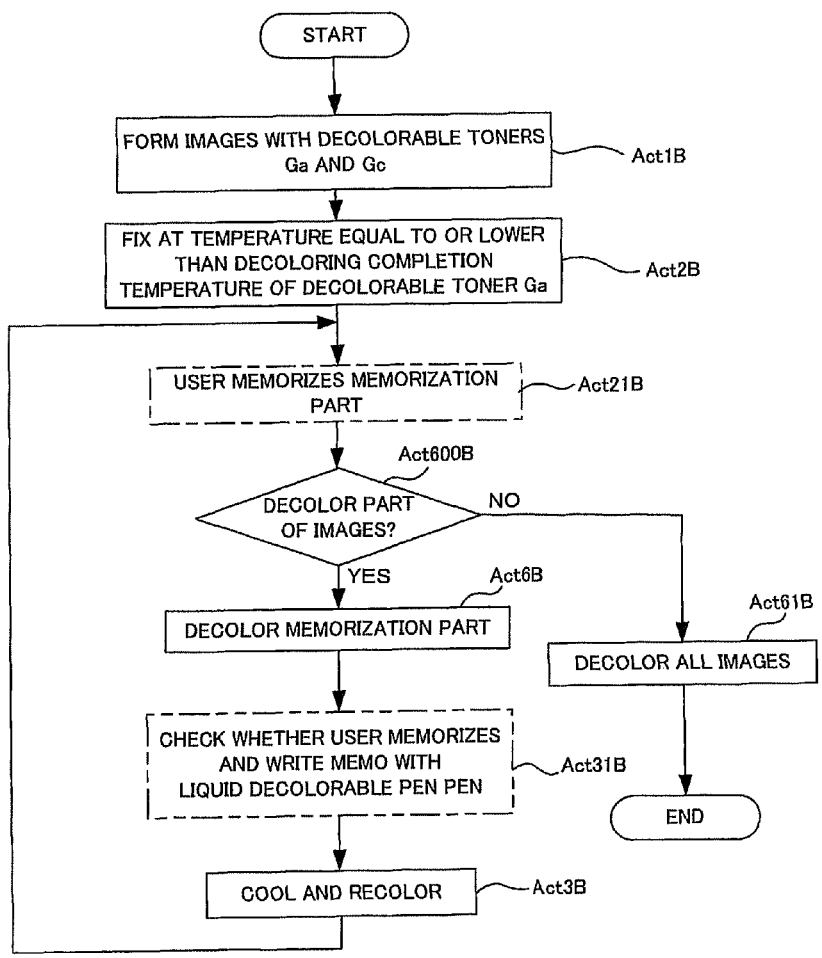
FIG. 14 is a flowchart for explaining reuse processing for a sheet by a sheet reusing system.

Reuse processing for a sheet by the sheet reusing system 1 according to this embodiment is explained below with reference to a flowchart of FIG. 14.

Figure 15:
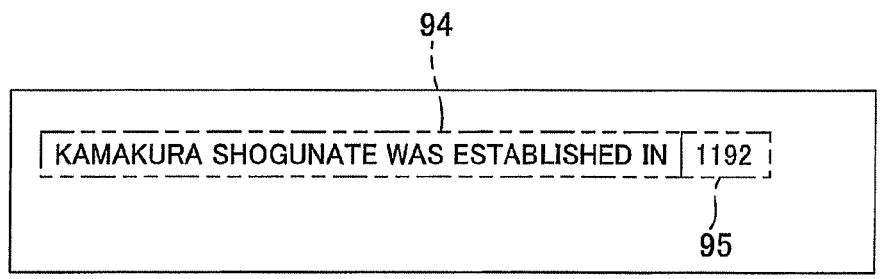
FIG. 15 is a diagram of an example of an image formed on a sheet.

FIG. 15 is an example of an image formed on a sheet.

Before fixing of the image, the image forming apparatus 100A forms a sentence part 94, which is a sentence, on a sheet with the unrecolorable decolorable toner Gc. The image forming apparatus 100A forms a memorization part 95, which is a part that a user desires to memorize in the sentence, on the sheet with recolorable decolorable toner Ga (Act 1B). In forming the sentence part 94 and the memorization part 95, for example, the image forming apparatus 100A may form the memorization part 95 in a color different from a color of the sentence part 94 and make the memorization part 95 conspicuous if both the sentence part 94 and the memorization part 95 are in a colored state.

Subsequently, the image forming apparatus 100A (the fixing-temperature control section 275) fixes the sentence part 94 and the memorization part 95 on the sheet at temperature 80° C. lower than the decoloring start temperature of the decolorable toner Ga (Act 2B). Consequently, both the sentence part 94 and the memorization part 95 are fixed on the sheet in the colored state.

After memorizing the memorization part 95 (Act 21B), the user sets the sheet in the sheet reusing apparatus 300. If the user decolors the memorization part 95, the user instructs the sheet reusing apparatus 300 to that effect. If the user decolors all the sentence part 94 and the memorization part 95 and reuses the sheet as a white paper, the user instructs the sheet reusing apparatus 300 to that effect.

If the sheet reusing apparatus 300 (the decoloring-temperature control section 386) receives the instruction to decolor the memorization part 95 (YES in Act 600B), the sheet reusing apparatus 300 heats the sheet at temperature 100° C. higher than the decoloring completion temperature 90° C. of the recolorable decolorable toner Ga and lower than the decoloring start temperature of the unrecolorable decolorable toner Gc (Act 6B). Consequently, only the memorization part 95 formed with the decolorable toner Ga is decolored and the sentence part 94 formed with the decolorable toner Gc is maintained in the colored state.

Therefore, since the memorization part 95 changes to a blank space, the user can easily check, while reading the sentence part 94, whether the user memorizes the memorization part 95 (Act 31B). In checking whether the user memorizes the memorization part 95, the user may write a memo or the like on the sheet with a liquid decolorable pen.

If the user desires to recolor the memorization part 95, the user sets the sheet in the sheet reusing apparatus 300 again and instructs the sheet reusing apparatus 300 to recolor the memorization part 95. Consequently, the sheet reusing apparatus 300 (the recoloring-temperature control section 385) cools the sheet at temperature −5° C. to −10° C. equal to or lower than the recoloring completion temperature −5° C. of the decolorable toner Ga and recolors the memorization part 95 formed with the decolorable toner Ga (Act 3B).

On the other hand, if the sheet reusing apparatus 300 (the decoloring-temperature control section 386) receives the instruction to reuse the sheet as white paper in Act 600B (NO in Act 600B), the sheet reusing apparatus 300 heats the sheet at temperature 120° C. higher than the decoloring completion temperature 110° C. of the unrecolorable decolorable toner Gc, decolors all the sentence part 94 and the memorization part 95, and changes the sheet to white paper (Act 61B).

In this embodiment, both the recolorable decolorable toner Ga and the unrecolorable and decolorable toner Gc, the decoloring start temperature of which is higher than the decoloring completion temperature 90° C. of the decolorable toner Ga, are fixed on the sheet in the colored state. Therefore, it is possible to select whether only a part of the image is decolored or the entire image is decolored by heating the sheet. It is possible to provide unprecedented uses of the sheets (the decolorable toners Ga and Gc).

In this embodiment, as in the first and second embodiments, before the decoloring processing 6B and 61B, an image on the sheet written by the liquid decolorable pen may be read and image data may be stored in the memory 383. The image data may be transmitted to the database or the like. After the decoloring processing 6B and 61B, it may be determined, according to whether the decoloring is sufficient, whether the sheet is reusable. The sheet may be diverted to the cassettes 36 and 37 according to a result of the determination.

Figure 16:
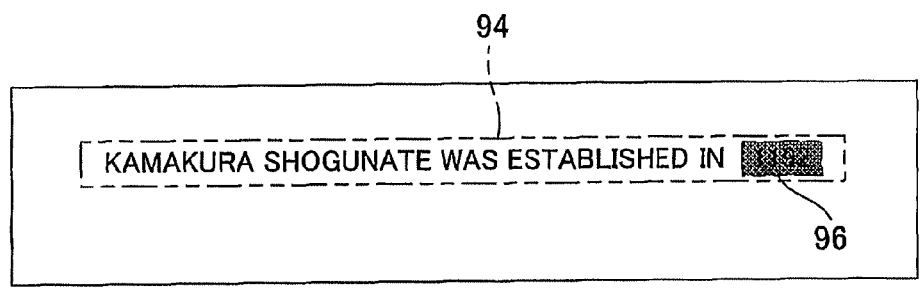
FIG. 16 is a diagram of another example of the image formed on the sheet.

FIG. 16 is another example of the image formed on the sheet.

In this embodiment, before fixing of the image, the image forming apparatus 100A may form the sentence part 94 on the sheet with the unrecolorable decolorable toner Gc. The image forming apparatus 100A may form, with the recolorable decolorable toner Ga, a mask part 96 in a portion desired to be hidden in the sentence part 94 (Act 1B).

In this case, the image forming apparatus 100A (the fixing-temperature control section 275) fixes the sentence part 94 and the mask part 96 on the sheet at temperature 80° C. lower than the decoloring start temperature of the decolorable toner Ga and fixes both the sentence part 94 and the mask part 96 on the sheet in the colored state (Act 2B).

If the sheet reusing apparatus 300 (the decoloring-temperature control section 386) receives an instruction to decolor the mask part 96 (YES in Act 600B), the sheet reusing apparatus 300 heats the sheet at temperature 100° C. higher than the decoloring completion temperature 90° C. of the recolorable decolorable toner Ga and lower than the decoloring start temperature of the unrecolorable decolorable toner Gc (Act 6B) and decolors only the mask part 96.

In this way, first, the portion desired to be hidden from the user can be hidden by the mask part 96. The user can use the sheet as, for example, a worm hole question sentence. The user can decolor the mask part 96 and check at a correct answer by heating the sheet at the predetermined temperature 100° C. with the sheet reusing apparatus 300. After checking the correct answer, the user can recolor the mask part 96 and reuse the sheet as a question sheet by cooling the sheet with the sheet reusing apparatus 300. The user can decolor both the sentence part 94 and the mask part 96 and reuse the sheet as white paper by heating the sheet at the predetermined temperature 120° C. with the sheet reusing apparatus 300.

Modifications

In the embodiments, the image forming apparatuses 100 and 100A transfer toners onto a sheet via the photoconductive members 23 and 24 to form images on the sheet. However, the image forming apparatuses 100 and 100A may eject inks on the sheet to form images on the sheet. In other words, the image forming apparatuses 100 and 100A do not have to use powdery decolorable toners as decolorable colorants and may use liquid decolorable inks.

In the embodiments, the sheet is cooled by the sheet reusing apparatus 300. However, the user may bring a container containing ice into contact with the sheet to cool the sheet.

In the embodiments, the image forming apparatuses 100 and 100A and the sheet reusing apparatus 300 are separate bodies. However, the functions of the sheet reusing apparatus 300 may be added to the image forming apparatuses 100 and 100A.

In the first and second embodiments, during the fixing, the recolorable decolorable colorant Ga is fixed in the completely decolored state by heating the sheet at temperature equal to or higher than the decoloring completion temperature of the recolorable decolorable colorant Ga. However, during the fixing, the recolorable decolorable colorant Ga may be fixed on the sheet in a state in which a part of the recolorable decolorable colorant Ga is decolored, i.e., a state in which the density of the image is low by heating the sheet at temperature equal to or higher than the decoloring start temperature of the recolorable decolorable colorant Ga and equal to or lower than the decoloring completion temperature of the recolorable decolorable colorant Ga.

In the third embodiment, as in the first and second embodiments, the recolorable decolorable colorant Ga does not have to be fixed in the completely colored state. The recolorable decolorable colorant Ga may be fixed on the sheet in a partially decolored state, i.e., a state in which the density of the image is low by heating the sheet at temperature equal to or higher than the decoloring start temperature of the recolorable decolorable colorant Ga and equal to or lower than the decoloring completion temperature of the recolorable decolorable colorant Ga.

In the embodiments, the image may be recolored in a state in which the decolorable colorant Ga is not completely recolored but is partially recolored, i.e., a state in which the density of the image is low by heating the sheet at temperature equal to or lower than the recoloring start temperature of the recolorable decolorable colorant Ga and equal to or higher than the recoloring completion temperature of the recolorable decolorable colorant Ga.

If decolorable ink of the liquid decolorable pen starts to be recolored at low temperature (e.g. −10° C.), when the sheet is cooled to recolor the image of the decolorable toner Ga, the sheet may be cooled at temperature (e.g., −5° C. to −10° C.) equal to or lower than the recoloring completion temperature (e.g., −5° C.) of the decolorable toner Ga and equal to or higher than recoloring start temperature (−10° C.) of the decolorable ink. In this way, it is possible to recolor only the image formed with the decolorable toner Ga while preventing recoloring of writing by the liquid decolorable pen.

After the image formed with the decolorable toner is recolored, the image on the sheet may be read by the second reading sections 35. On the basis of the image data, if the recoloring is sufficient, the sheet may be determined as reusable and may be discharged to the reusable sheet cassettes 36. If the recoloring is insufficient, the sheet may be determined as unreusable and may be discharged to the unreusable sheet cassette 37.

A form of a recording medium may be any form as long as the recording medium is a recording medium that can store a computer program and can be read by a computer. Specifically, examples of the recording medium include an internal storage device mounted on the inside of the computer such as a ROM or a RAM, a portable storage medium such as a CD-ROM, a flexible disk, a DVD disk, a magneto-optical disk, or an IC card, a database that stores a computer program, and other computers and databases of the computers. Functions obtained by installation or download may be functions realized in cooperation with an OS or the like in an apparatus. The computer program may be an execution module that is dynamically generated partially or entirely.

The order of the kinds of processing in the embodiments may be different from the order explained as an example in the embodiments.

The decoloring start temperatures, the decoloring completion temperatures, the recoloring start temperatures, and the recoloring completion temperatures of the toners Ga, Gb, and Gc, the fixing temperature that is the heating temperature of the sheet, the cooling temperature of the sheet, and the like in the embodiments may be set as appropriate.

As explained above in detail, according to the technique descried in this specification, it is possible to provide a technique for forming an image on a sheet to reuse the sheet.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the sprit of the inventions. The accompanying claims and their equivalents are intended to cover such forms or modifications as would fall within the scope and spirit of the inventions.

What is claimed is:

1. An image forming apparatus comprising:
an image forming section configured to form images on a sheet by using both a recolorable decolorable colorant and an undecolorable colorant;
a fixing device configured to heat the sheet to fix the recolorable decolorable colorant and the undecolorable colorant on the sheet at the same time; and
a fixing-temperature control section configured to perform temperature control for the fixing device and fix the recolorable decolorable colorant and the undecolorable colorant on the sheet at a temperature higher than a decoloring start temperature of the recolorable decolorable colorant to thereby fix the recolorable decolorable colorant on the sheet in a decolored state and fix the undecolorable colorant on the sheet in a colored state.

2. The apparatus according to claim 1, further comprising:
a cooling section configured to cool the sheet; and
a recoloring-temperature control section configured to perform temperature control for the cooling section and cool the sheet to a temperature equal to or lower than the recoloring start temperature of the recolorable decolorable colorant.

3. The apparatus according to claim 1, further comprising:
a reading section configured to read the images on the sheet; and
a communication section configured to transmit read image data.

4. The apparatus according to claim 1, further comprising:
a reading section configured to read, after the sheet is cooled to a temperature equal to or lower than a recoloring start temperature of the recolorable decolorable colorant and the image formed with the recolorable decolorable colorant is recolored, the images on the sheet subjected to decoloring processing by heating; and
a determining section configured to determine, on the basis of image data of the sheet, whether the sheet is reusable.

5. An image forming apparatus comprising:
an image forming section configured to form images on a sheet with a recolorable decolorable colorant and an unrecolorable decolorable colorant, the unrecolorable decolorable colorant having a decoloring start temperature of which is higher than decoloring start temperature of the recolorable decolorable colorant;
a fixing device configured to heat the sheet to fix the recolorable decolorable colorant and the unrecolorable decolorable colorant on the sheet;
a control section configured to perform temperature control for the fixing device and fix the recolorable decolorable colorant and the unrecolorable decolorable colorant on the sheet at temperature higher than the decoloring start temperature of the recolorable decolorable colorant and lower than the decoloring start temperature of the unrecolorable decolorable colorant to thereby fix the recolorable decolorable colorant on the sheet in a decolored state and fix the unrecolorable decolorable colorant on the sheet in a colored state.

6. The apparatus according to claim 5, further comprising
a cooling section configured to cool the sheet, wherein
the control section performs temperature control for the cooling section and cools the sheet to a temperature equal to or lower than the recoloring start temperature of the recolorable decolorable colorant.

7. The apparatus according to claim 5, further comprising:
a reading section configured to read the images on the sheet; and a communication section configured to transmit read image data.

8. The apparatus according to claim 5, further comprising:
a reading section configured to read, after the sheet is cooled to a temperature equal to or lower than a recoloring start temperature of the recolorable decolorable colorant and the image formed with the recolorable decolorable colorant is recolored, the images on the sheet subjected to decoloring processing for the recolorable decolorable colorant by heating or decoloring processing for the recolorable decolorable colorant and the unrecolorable and decolorable colorant by heating; and
a determining section configured to determine, on the basis of image data of the sheet, whether the sheet is reusable.

9. An image forming apparatus comprising:
an image forming section configured to form images on a sheet by using both a recolorable decolorable colorant and an unrecolorable decolorable colorant, the unrecolorable decolorable colorant having a decoloring start temperature of which is higher than a decoloring start temperature of the recolorable decolorable colorant;
a fixing device configured to heat the sheet to fix the recolorable decolorable colorant and the unrecolorable decolorable colorant on the sheet at the same time; and
a control section configured to perform temperature control for the fixing device and fix the recolorable decolorable colorant and the unrecolorable decolorable colorant on the sheet at a temperature lower than the decoloring start temperature of the recolorable decolorable colorant to thereby fix both the recolorable decolorable colorant and the unrecolorable decolorable colorant on the sheet in a colored state.

10. The apparatus according to claim 9, further comprising a cooling section configured to cool the sheet, wherein
the control section performs temperature control for the cooling section and cools the sheet to a temperature equal to or lower than the recoloring start temperature of the recolorable decolorable colorant.

11. An image forming apparatus comprising:
an image forming section configured to form images on a sheet with a recolorable decolorable colorant and an unrecolorable decolorable colorant, the unrecolorable decolorable colorant having a decoloring start temperature of which is higher than a decoloring start temperature of the recolorable decolorable colorant,
a fixing device configured to heat the sheet to fix the recolorable decolorable colorant and the unrecolorable decolorable colorant on the sheet; and
a control section configured to perform temperature control for the fixing device and fix the recolorable decolorable colorant and the unrecolorable decolorable colorant on the sheet at temperature lower than decoloring start temperature of the unrecolorable decolorable colorant to thereby fix the recolorable decolorable colorant on the sheet in a decolored state and fix the unrecolorable decolorable colorant on the sheet in a colored state or fix both the recolorable decolorable colorant and the unrecolorable decolorable colorant on the sheet in the colored state.

12. The apparatus according to claim 11, further comprising a cooling section configured to cool the sheet, wherein
the control section performs temperature control for the cooling section and cools the sheet to a temperature equal to or lower than the recoloring start temperature of the recolorable decolorable colorant.

13. A processing method for reuse of a sheet comprising:
forming images on the sheet with both a recolorable decolorable colorant and an undecolorable colorant; and
fixing the recolorable decolorable colorant and the undecolorable colorant by a fixing device on the sheet at the same time at a temperature higher than a decoloring start temperature of the recolorable decolorable colorant to thereby fix the recolorable decolorable colorant by the fixing device on the sheet in a decolored state and fix the undecolorable colorant by the fixing device on the sheet in a colored state.

14. The method according to claim 13, further comprising, after fixing the recolorable decolorable colorant on the sheet in the decolored state and fixing the undecolorable colorant on the sheet in the colored state, cooling the sheet to a temperature equal to or lower than the recoloring start temperature of the recolorable decolorable colorant.

15. The method according to claim 13, further comprising:
recoloring the image on the sheet formed with the recolorable decolorable colorant by cooling the sheet to a temperature equal to or lower than the recoloring start temperature of the recolorable decolorable colorant;
reading the images on the sheet on which the image formed with the recolorable decolorable colorant is recolored; and
transmitting read image data.

16. The method according to claim 13, further comprising:
recoloring the image on the sheet formed with the recolorable decolorable colorant by cooling the sheet to a temperature equal to or lower than the recoloring start temperature of the recolorable decolorable colorant;
heating the sheet on which the image formed with the recolorable decolorable colorant is recolored and subjecting the sheet to decoloring processing;
reading the images on the sheet subjected to the decoloring processing; and
determining, on the basis of image data of the sheet, whether the sheet is reusable.

17. A processing method for reuse of a sheet comprising:
forming images on the sheet with a recolorable decolorable colorant and an unrecolorable decolorable colorant, the unrecolorable decolorable colorant having a decoloring start temperature of which is higher than a decoloring start temperature of the recolorable decolorable colorant; and
fixing the recolorable decolorable colorant and the unrecolorable decolorable colorant on the sheet at a temperature higher than the decoloring start temperature of the recolorable decolorable colorant and lower than the decoloring start temperature of the unrecolorable decolorable colorant to thereby fix the recolorable decolorable colorant on the sheet in a decolored state and fix the unrecolorable decolorable colorant on the sheet in a colored state.

18. The method according to claim 17, further comprising, after fixing the recolorable decolorable colorant on the sheet in the decolored state and fixing the undecolorable colorant on the sheet in the colored state, cooling the sheet to a temperature equal to or lower than the recoloring start temperature of the recolorable decolorable colorant.

19. The method according to claim 17, further comprising:
recoloring the image on the sheet formed with the recolorable decolorable colorant by cooling the sheet to a temperature equal to or lower than a recoloring start temperature of the recolorable decolorable colorant;

reading the images on the sheet on which the image formed with the recolorable decolorable colorant is recolored; and transmitting read image data.

20. The method according to claim 17, further comprising:

recoloring the image on the sheet formed with the recolorable decolorable colorant by cooling the sheet to a temperature equal to or lower than a recoloring start temperature of the recolorable decolorable colorant;

heating the sheet on which the image formed with the recolorable decolorable colorant is recolored and subjecting the sheet to decoloring processing;

reading the images on the sheet subjected to the decoloring processing; and determining, on the basis of image data of the sheet, whether the sheet is reusable.

21. A processing method for reuse of a sheet comprising:

forming images on the sheet with a recolorable decolorable colorant and an unrecolorable decolorable colorant, the unrecolorable decolorable colorant having a decoloring start temperature of which is higher than a decoloring start temperature of the recolorable decolorable colorant; and fixing the recolorable decolorable colorant and the unrecolorable decolorable colorant on the sheet at a temperature lower than the decoloring start temperature of the recolorable decolorable colorant to thereby fix both the recolorable decolorable colorant and the unrecolorable decolorable colorant on the sheet in a colored state.

22. The method according to claim 21, further comprising, after fixing both the recolorable decolorable colorant and the unrecolorable decolorable colorant on the sheet in the colored state, cooling the sheet to temperature equal to or lower than the recoloring start temperature of the recolorable decolorable colorant.

23. A processing method for reuse of a sheet comprising:

forming images on the sheet with a recolorable decolorable colorant and an unrecolorable decolorable colorant, the unrecolorable decolorable colorant having a decoloring start temperature of which is higher than a decoloring start temperature of the recolorable decolorable colorant; and fixing the recolorable decolorable colorant and the unrecolorable decolorable colorant on the sheet at a temperature lower than the decoloring start temperature of the unrecolorable decolorable colorant to thereby fix the recolorable decolorable colorant on the sheet in a decolored state and fix the unrecolorable decolorable colorant on the sheet in a colored state or fix both the recolorable decolorable colorant and the unrecolorable decolorable colorant on the sheet in the colored state.

24. The method according to claim 23, further comprising, after fixing both the recolorable decolorable colorant and the unrecolorable decolorable colorant on the sheet, cooling the sheet to a temperature equal to or lower than the recoloring start temperature of the recolorable decolorable colorant.

* * * * *